(12) United States Patent
Lugg et al.

(10) Patent No.: US 8,636,241 B2
(45) Date of Patent: Jan. 28, 2014

(54) HYBRID JET/ELECTRIC VTOL AIRCRAFT

(76) Inventors: Richard H. Lugg, Falmouth, ME (US);
Harold Youngren, Stovington, ME (US)

( * ) Notice: Subject to any disclaimer, the term of this patent is extended or adjusted under 35 U.S.C. 154(b) by 1037 days.

(21) Appl. No.: 11/912,046

(22) PCT Filed: Apr. 20, 2006
(Under 37 CFR 1.47)

(86) PCT No.: PCT/US2006/014902
§ 371 (c)(1),
(2), (4) Date: Jan. 28, 2010

(87) PCT Pub. No.: WO2006/113877
PCT Pub. Date: Oct. 26, 2006

(65) Prior Publication Data
US 2013/0062455 A1   Mar. 14, 2013

(51) Int. Cl.
*B64C 15/02* (2006.01)
(52) U.S. Cl.
USPC .................... 244/12.3; 244/12.1; 244/12.4
(58) Field of Classification Search
USPC .................. 244/12.1, 12.3, 23 R, 23 B, 55
See application file for complete search history.

(56) References Cited

U.S. PATENT DOCUMENTS

| | | | |
|---|---|---|---|
| 2,636,665 A | 4/1953 | Albert | |
| 2,659,528 A | 11/1953 | Price | |
| 3,110,456 A | 11/1963 | Creasey et al. | |
| 3,388,878 A * | 6/1968 | Peterson et al. | 244/23 B |
| 3,465,162 A * | 9/1969 | Oprecht | 290/4 R |
| 3,546,882 A | 12/1970 | Berkey | |
| 3,618,875 A * | 11/1971 | Kappus | 244/12.3 |
| 3,678,306 A | 7/1972 | Garnier | |
| 3,831,887 A | 8/1974 | Fosness | |
| 4,010,608 A | 3/1977 | Simmons | |
| 4,032,087 A * | 6/1977 | Cleaves | 244/214 |
| 4,333,607 A * | 6/1982 | Mueller et al. | 239/13 |
| 4,828,203 A * | 5/1989 | Clifton et al. | 244/12.3 |
| 4,874,312 A | 10/1989 | Hailey | |
| 5,170,623 A | 12/1992 | Dailey et al. | |
| 5,452,575 A | 9/1995 | Freid | |
| 6,254,032 B1 | 7/2001 | Bucher | |
| 6,382,559 B1 * | 5/2002 | Sutterfield et al. | 244/23 A |
| 6,561,456 B1 * | 5/2003 | Devine | 244/12.1 |
| 6,843,447 B2 | 1/2005 | Morgan | |
| 7,032,861 B2 | 4/2006 | Sanders, Jr. et al. | |

(Continued)

FOREIGN PATENT DOCUMENTS

WO    2007035298 A2    3/2007

OTHER PUBLICATIONS

International Search Report and Written Opinion dated Jun. 7, 2010 for PCT/US09/54317.

*Primary Examiner* — Christopher P Ellis
*Assistant Examiner* — Medhat Badawi
(74) *Attorney, Agent, or Firm* — Verrill Dana, LLP; Chris A. Caseiro (57) ABSTRACT

A fixed-wing VTOL aircraft features an array of electric lift fans distributed over the surface of the aircraft. A generator is (selectively) coupled to the gas turbine engine of the aircraft. During VTOL operation of the aircraft, the engine drives the generator to generate electricity to power the lifting fans. Power to the lifting fans is reduced as the aircraft gains forward speed and is increasingly supported by the wings.

22 Claims, 10 Drawing Sheets

(56) References Cited

U.S. PATENT DOCUMENTS

| | | |
|---|---|---|
| 7,191,855 B2* | 3/2007 | Vasilantone ............ 180/65.245 |
| 7,661,271 B1 | 2/2010 | Millsaps, Jr. |
| 2003/0085324 A1 | 5/2003 | Battisti |
| 2004/0049324 A1* | 3/2004 | Walker .............................. 701/1 |
| 2005/0034464 A1 | 2/2005 | Gonzalez |
| 2007/0057113 A1* | 3/2007 | Parks ........................... 244/12.5 |
| 2007/0126292 A1 | 6/2007 | Lugg |
| 2007/0251241 A1 | 11/2007 | Fielder |
| 2008/0169375 A1* | 7/2008 | Ishikawa ...................... 244/12.1 |
| 2009/0127379 A1* | 5/2009 | Lugg ........................... 244/12.3 |
| 2010/0083669 A1 | 4/2010 | Foster et al. |

* cited by examiner

HYBRID JET/ELECTRIC VTOL AIRCRAFT

CROSS-REFERENCE TO RELATED APPLICATIONS

This application claims priority benefit of provisional U.S. applications 60/673,166 filed Apr. 20, 2005, and 60/695,690 filed Jun. 30, 2005, the contents of each of which is incorporated by reference in the entirety.

FIELD OF THE INVENTION

The invention relates to vertical take-off and landing (VTOL) or short take-off/vertical landing (STOVL) aircraft. (The term "VTOL" will be used hereafter to refer to VTOL or STOVL.) More particularly, the invention relates to fixed-wing VTOL aircraft.

BACKGROUND OF THE INVENTION

In general, two types of VTOL aircraft have been built and flown successfully: 1) rotary wing aircraft (helicopters) and 2) vectored-thrust, fixed-wing aircraft (e.g., the Harrier "Jump-Jet" and the JSF Joint Strike Fighter), in which the thrust generated by a turbojet engine is vectored downwardly for lift-off and then re-directed horizontally for wing-supported forward flight. Tilt-rotor vehicles such as the V-22 Osprey, in which vertically oriented rotors lift/lower the aircraft during takeoff/landings and rotate into horizontally oriented positions to propel the aircraft for wing-supported forward flight, are also known.

Although such aircraft serve their purposes with varying degrees of success, they are not without their limitations. For example, helicopters are limited in their forward speeds due to various aerodynamic considerations, including advancing/retreating blade aerodynamics. Additionally, the mechanical linkage systems by means of which power is transferred from the engines to the primary and tail rotors of helicopters are relatively complex and heavy. Similarly, the mechanical systems by means of which the engines of tilt-rotor aircraft pivot between their take-off/landing and forward flight orientations are extremely complex, and such tilt-rotor aircraft have not enjoyed widespread success.

Currently known fixed wing, vectored-thrust VTOL aircraft, on the other hand, are able to operate at much higher airspeeds than helicopters and tilt-rotor aircraft. Additionally, their thrust-vectoring systems are generally less complex and lighter than the pivoting systems found in tilt-rotor aircraft. Unfortunately, however, because current vectored-thrust VTOL aircraft lift and lower themselves by directing their engine exhaust directly downward, repeated operation of such aircraft in a given locale is limited to areas in which the ground surface has been specially prepared to withstand impingement of the hot gas exhaust. Furthermore, because such aircraft use the thrust of their engines directly and engine bleed-off air to respectively support and control the aircraft while in lifting/hover mode, which provides a relatively limited number of support posts or force points, control of such aircraft in hover mode can be relatively sensitive.

Further disadvantages of current VTOL systems may be summarized as follows. First, high power is required for VTOL in direct thrust systems. As a result, it is difficult to achieve sufficient margins for VTOL operation. Therefore, the engine is oversized, and significantly larger margins of engine thrust are required for VTOL than for efficient horizontal flight operation, and therefore range and efficiency of operation are reduced. Second, systems using direct engine thrust have high effluent velocities from engine jet (approximately 2400 feet/second) and high exhaust temperatures (approximately 1250° F.). As a result, direct thrust systems have problems with hot gas ingestion of re-circulating exhaust flow as it mixes with ambient air underneath the aircraft while in ground effect. This can cause sudden loss of thrust and vertical control as the hot gas can stall or surge the turbine engine. Third, systems using highly loaded lift fans (e.g. JSF shaft-driven lift fan) still have very high downwash velocity from the lift fan (approximately 800 feet/second). Fourth, current systems exhibit relatively poor control of VTOL attitude, since they typically use high-pressure bleed air from the engine, which reduces the engine thrust margin and delays control—particularly in roll and yaw (as in the use of thrust roll posts in the JSF). Fifth, there is generally poor, slow control of altitude and vertical velocity due to turbine engine spool-up and spool-down time, hence throttle lags. Sixth, there is a high potential for catastrophic failure, since there is no lift fan or engine redundancy in current VTOL lift or control systems.

In addition to the preceding, the following information may also be helpful to appreciating the current invention and the benefits and advantages of the invention.

Currently, the principal approaches for practical VTOL flight vehicles, some of which are referenced above, can be grouped into three broad categories: low- to medium-speed vehicles with rotors (helicopters, tilt-rotors, and similar aircraft); low-speed lifting fan or ducted fan vehicles with more than one lifting fan (such as a flying platform like the Paisecki Flying Jeep); and high-speed vehicles using jet thrust or variations of jet thrust and highly loaded lifting fans (e.g., the Harrier and the JSF). These approaches are differentiated by many factors, but one of the most significant factors is the thrust loading for the propulsion system that provides lift for takeoff and transition to wing-borne low-speed forward flight. The thrust loading (pounds per square foot loading of the propulsor), or power loading (pounds of thrust per shaft horsepower) of the propulsor(s), determines the power required to lift the aircraft and the velocity of the corresponding momentum stream (downwash) below it.

In many designs, the propulsion system is used to provide both vertical forces for hover and horizontal forces for forward flight. This can be done by tilting the VTOL propulsion device (e.g., the rotor in a helicopter or tilt-rotor) or by providing a separate propulsion device. Some implementations of VTOL aircraft such as flying platforms (e.g., the Paisecki Flying Jeep) generate horizontal propulsion forces by tilting the entire vehicle. Other implementations of VTOL aircraft (e.g., the UrbanAero X-Hawk and the vehicle illustrated in U.S. Pat. No. 6,464,166) use sets of vanes in the exit flow of vertically mounted fans. Developmental programs such as the Defense Advance Research Projects Agency's Canard Rotor/Wing project (Dragonfly X-50) seek to combine rotor technology for VTOL flight with high-speed flight, by stopping the rotor and propelling the vehicle in forward flight—supported on the stopped rotor—using conventional jet thrust to do so.

Helicopters and Tilt-Rotors

Helicopters are very efficient for VTOL and low-speed flight because they operate at low thrust loadings (typically 20-30 lb/ft$^2$), which greatly reduces both power requirements and downwash velocity. However, a generally large rotor diameter is required to achieve the desirable low thrust loadings. The large diameter rotors operate at relatively low rotational speeds (to avoid problems with supersonic flow on the blades), so heavy, high-torque transmissions and shafting are needed to drive them. Moreover, the sheer size of the unprotected rotor disk leads to handling and safety issues with blade strike in obstacle-rich environments.

Furthermore, rotorcraft normally use articulated rotors for control by changing the collective and cyclic pitch of individual blades through a swashplate. The blades must be mounted in a hub that supports the blades and lets them rotate for pitch changes. As a result of this configuration, rotorcraft are mechanically complex and are subject to large vibratory loads as loading changes on the rotating blades. Torques generated by the rotor must be balanced, either by a tail rotor or another main rotor, further increasing complexity and weight.

Tilt-rotors combine helicopter VTOL efficiency with wing-borne flight at higher speeds by tilting the entire rotor system to act as propellers for forward flight. Tilt-rotors operate at higher thrust loading (typically 40-70 lb/ft$^2$), with consequently higher power requirements and downwash velocity. Tilt-rotors also use the same mechanically complex collective and cyclic pitch control scheme for the rotors.

One of the great benefits of both helicopters and tilt-rotors is that they provide high levels of control in VTOL and low-speed flight. Their low downwash velocities permit operation over relatively unprepared surfaces and pose minimal danger to nearby ground personnel. However, a significant drawback of rotorcraft is their limited speed in forward flight. In particular, large differences in velocity between the advancing and retreating blades limit helicopter maximum speeds to less than 200 knots, and tilt-rotor aircraft have similar maximum speed limitations in VTOL and transitional flight (typically 350 knots). In forward flight with their rotors tilted forward, tilt-rotor aircraft are much faster than helicopters; nevertheless, the use of large rotors as propellers limits tilt-rotor aircraft's maximum speeds to less than 350 knots (e.g., 275 knots for the Boeing V-22 Osprey at cruise).

Hovering Platforms and Ducted Fans

Ducted fan aircraft and hovering platforms have even higher associated thrust loadings. These vehicles operate at intermediate propulsion system thrust loadings (on the order of 100-250 lb/ft$^2$), with increased power requirements and associated downwash velocities as compared to helicopters but at a fraction of the downwash velocities associated with jet thrust-based VTOL systems. One advantage of these systems is that the rotors are contained within a shroud or duct that protects them from blade strike with other objects.

Examples of ducted fan vehicles include the Bell X-22A quad-rotor ducted fan aircraft. This vehicle was a "proof-of-concept" aircraft that demonstrated VTOL and forward flight capabilities, but it had the disadvantage of great mechanical complexity. In this aircraft, four turboshaft engines were used to power the vehicle, driving a complex transmission system and shafting to the four ducted fans. Fan lift control used variable pitch on the blades and another complex mechanism for the tilting ducts and rotors. Additionally, the X-22A was not a high-speed aircraft, with a maximum speed of only 255 knots. Although that is higher than a helicopter's maximum forward speed, it is less than the maximum speeds for tilt-rotor aircraft.

Flying platforms are another type of fan-driven vehicles in this category. These vehicles are typically built around two or three vertically oriented, fixed fans arranged in a flat body to provide lift. Power is applied to the fans by a mechanically complex transmission and shafting arrangement. Examples of this type of aircraft include the Paisecki Flying Jeep, which was built for the U.S. Army and Navy in the 1960's. The flying platforms were limited in control in VTOL and forward flight, depending on rotor blade pitch or throttle for vertical control and vanes in the fan flow for yaw and roll control. Flying platforms were primarily vehicles for hover and low-speed flight, using tilt of the overall vehicle lift vector to provide thrust for forward flight. These vehicles had relatively low maximum speeds (less than 100 knots) and became difficult to control at high speeds due to aerodynamic problems with the ducts in axial cross-flow.

More recent examples of flying platforms include the UrbanAero X-Hawk and the vehicle illustrated in U.S. Pat. No. 6,464,166. These aircraft use sets of vanes in the inflow and exit flow of the fans to generate moments and side forces, and variable pitch propellers for lift control. A separate set of fans is used to provide thrust for forward flight. A fly-by-wire control system is used to automate vehicle control. These aircraft are mechanically complex, with transmission and gearboxes to distribute engine power to the fans and rotors. Maximum speeds for these vehicle is very limited—only 80-100 knots.

Other examples of ducted fan aircraft include the Ryan XV-5A/B, which was built in the late 1950's and early 1960's. In VTOL, redirected engine exhaust gases were used to drive two wing-mounted lift fans and a forward fuselage-mounted fan. Louvered vanes were used in the fans for control and horizontal thrust in VTOL, and the engine exhaust was redirected to a conventional jet nozzle for forward flight. This vehicle demonstrated the fundamental feasibility of the fan-in-wing concept, but it had significant problems with transition between VTOL and forward flight. (Four aircraft were built; three crashed due to control-related problems in transition. The last prototype was turned over to NASA and now sits in an air museum)

Direct-Jet-Thrust VTOL Systems

VTOL jet fighters such as the JSF use either direct jet thrust to support the aircraft during takeoff and landing (as in the case of the Boeing X-32 JSF entry or the Harrier) or jet thrust combined with a highly loaded, mechanically driven fan (e.g., a turbofan or a shaft-driven lift fan as used in the Lockheed-Martin X-35). These vehicles operate at very high propulsor thrust loadings, e.g., on the order of 2500 lb/ft$^2$ or higher for the jet engines and 1500 lb/ft$^2$ for the direct-driven lift fans. As a result of such high thrust loadings, these aircraft must operate with far more power than helicopters and tilt-rotors in VTOL flight. These vehicles are inherently high-speed aircraft, with engines sized (as a result of their inefficiency for VTOL propulsion) for very high power levels.

The downwash velocities associated with direct-lift jet or lift fan systems is very high—between 800 feet/sec (lift fan) and 2000 feet/sec (jet thrust). This is dangerously high for ground personnel, and it makes it unlikely that these vehicles could be operated from any but carefully prepared reinforced surfaces. Additionally, the exhaust temperatures associated with direct-jet-thrust systems is very high—up to 1200° F.—thus posing an additional problem for near-ground operations. Furthermore, problems with hot gas ingestion of downwash flow into the flight engine can cause catastrophic losses in lift. Careful management of the flows around these vehicles complicates their design and utilization, compromises their performance, and severely restricts the near-ground VTOL operation of these aircraft.

Despite the high power levels, these aircraft remain limited in terms of true VTOL capabilities under high-altitude, hot-day conditions, where engine thrust is reduced. This forces designers of direct-thrust systems to use sea-level thrust-to-weight ratios (T/W) as high as 1.5 to provide sufficient thrust margins for safe operation in challenging conditions. Such high T/W for the propulsion system leads to a gross mismatch of the engine thrust to the thrust required for efficient transonic cruise flight. This mismatch occurs because the typical cruise lift-to-drag ratio (L/D) for a fighter aircraft or unmanned combat air vehicle is between 6 and 10, which implies that a T/W of between 1/10 and 1/6 is needed at the cruise altitude. The reduction of thrust available with altitude will normally provide this match within the engine operating altitude range at throttle settings that provide good specific fuel consumption. If the engine thrust is too high at sea level (i.e. sized for VTOL), the engine must be operated at reduced throttle settings that are not efficient for long-range flight.

The current design of VTOL systems using direct-thrust also poses a problem in terms of balancing the lifting forces about the center of gravity (CG) of the aircraft. Placement of the engine nozzle at the aft end of the vehicle requires a so-called "magic finger" to provide balancing lift forces. In the case of the JSF, the lift fan provides this "magic finger," but the layout of these vehicles is very sensitive to overall loading and thrust margins for the components.

Direct-thrust or lift-fan systems as currently implemented struggle with problems of control in VTOL and transitional flight. These systems provide vertical control through engine throttle manipulation. The throttle response of turbine engines is quite slow as a result of the high rotational inertia of the engine spools. These throttle lags greatly complicate control of the aircraft vertical state (altitude, vertical speed, and acceleration).

In direct-thrust or lift-fan systems, high-pressure bleed air from the engine is used in reaction nozzles on the wing and fuselage for roll and yaw control in VTOL, which reduces the thrust available from the engine to support the aircraft. Furthermore, the control forces from these systems are adequate but limited in terms of control authority. In addition, there is limited control power available from these bleed-air systems. When high levels of control response are commanded and the need for additional engine power is greatest, the ability of the engine to deliver that power is reduced by the use of bleed air. This is an inherent flaw in the bleed-air-based VTOL systems. These direct-jet-thrust systems also provide no redundancy for propulsion or control components.

In view of the foregoing, it is clear that there is a need for a high-speed VTOL aircraft that is mechanically less complex and faster than conventional rotorcraft (including tilt-rotor rotorcraft), that provides properly matched thrust loadings, and that can be launched from a greater variety of takeoff points than conventional high speed VTOL aircraft such as the Harrier and the JSF.

SUMMARY OF THE INVENTION

The present invention provides a hybrid jet/electric VTOL aircraft that resolves or avoids the limitations of prior art VTOL aircraft addressed above. To that end, the present invention features a fixed-wing VTOL aircraft which takes off, lands, and hovers on a number of electrically powered lifting fans and that is powered for forward flight by one or more gas turbine engines. During vertical flight (i.e., takeoff, landing, and hover), electricity to drive the fans is generated using a generator that is driven off of one of the gas turbine engines. (A twin-engine configuration, with a generator driven off of each engine, is a preferred embodiment.) Residual thrust may be directed downward to augment or supplement the lift generated by the fans through a vectoring nozzle.

(As used herein, the term "fixed-wing" refers to aircraft in which the main lift-producing wings remain generally or relatively stationary relative to the vehicle during flight. The term is broad enough, however, to cover "swing-wing" aircraft such as the F-14 and the B1, in which the wings can be pivoted fore and aft during flight to assume different trim configurations depending on the vehicle's operating point.)

A hybrid VTOL jet-electric air vehicle as per the invention allows the thrust capability of the engine to be more closely matched to the thrust required to achieve efficient horizontal flight for the airframe of the vehicle in which the engine is installed. Prior art vectored thrust VTOL aircraft have suffered thrust inefficiencies in forward flight because the engine thrust requirements have been set by the requirements to achieve VTOL using vectored thrust (whether vectored thrust alone or vectored thrust augmented by a mechanically shaft-driven lift fan). The thrust required to achieve VTOL using vectored thrust has uniformly been substantially in excess of the thrust required to achieve efficient forward flight because the conversion of thrust from the gas turbine engine to lifting force has been relatively inefficient (because the lifting forces are concentrated in one or more jet thrust columns and in one column of lift fan discharge, and very high thrust forces are required to achieve VTOL—hence, inefficient high thrust loadings). With the current invention, in contrast, because the electrical system and the lift fans are able to achieve high efficiencies in converting the power from the gas turbine engine to lift thrust and because the lifting forces are widely spread at lower velocities and at greater fan thrust efficiencies (due to lower fan loadings), less thrust capacity is required from the gas turbine engine to achieve VTOL, and thus the gas turbine engine may be sized more appropriately to the requirements of the airframe to achieve efficient forward flight.

Also advantageously, the use of multiple electric lift fans distributed throughout the airframe of the vehicle enables the vehicle to achieve greater stability in VTOL operations than was previously possible. In the prior art, in-service VTOL aircraft have utilized only two "columns" of lift thrust—both columns being in the centerline of the aircraft (in the case of JSF) or immediately adjacent to the centerline (in the case of the Harrier). One experimental aircraft (the Ryan X-5A) utilized three columns—one on the centerline and one in each of the two wings. Aircraft in the prior art depended upon all columns of thrust for safe operation in VTOL. A VTOL aircraft per the invention, in contrast, provides a level of redundancy that permits the loss of thrust from one or more fans without compromising the aircraft.

Further advantageously, now there is a fixed wing VTOL aircraft which does not have the constraints of high heat and high exhaust gas velocities in ground effect, as now the gas is ambient air temperature, traveling at low velocity and low temperature. Thus the air vehicle of the invention can take off and land from unprepared surfaces (tarmac, dirt, and grass), unlike certain VTOL aircraft in the prior art (e.g., Harrier, JSF, XV-5A/B, and Yakovlev), which must use specially prepared reinforced surfaces. The vehicle of the invention shows distinct advantages over prior art VTOL vehicles offering low average downwash velocity from its distributed fan system for VTOL lift.

A vehicle according to the invention operates in VTOL with residual exhaust gas temperatures of 400-600 degrees Fahrenheit, and exhaust velocities of 300-600 feet per second, as compared to exhaust gas flow in prior art VTOL aircraft of 1200-1400 degrees Fahrenheit and exhaust gas velocities of over 2000 feet per second. Reduced exhaust temperatures due to engine power extraction are a decided advantage in the new concept, as the invention reduces airborne debris from lower exhaust flow and ambient VTOL lift from the electric fans, eases operation of personnel around the air vehicle providing a safer lift-off environment, and reduces fire hazards due to lower temperature exhaust and downward jet exhaust environment.

In a first aspect, the invention features a fixed-wing VTOL aircraft having a thrust-producing gas turbine engine, an array of electric lift fans distributed across the body of the aircraft, and a generator that is (selectively) driven by the gas turbine engine. The fans are powered by electricity generated by the gas turbine engine. In specific embodiments, the fans are, in total, able to support at least 25% of the weight of the aircraft, more preferably at least 50% of the weight of the aircraft, still more preferably at least 90% of the weight of the aircraft, and, most preferably, are able to support up to the entire weight of the aircraft.

In a second aspect, the invention features a method of operating a fixed-wing VTOL aircraft. According to this aspect of the invention, the aircraft lifts off from a resting surface using electrically powered lifting fans and then transitions to forward wing-borne flight, with thrust for forward flight being provided by one or more gas turbine engines. Electricity to drive the lifting fans is generated by the gas turbine engine(s). In preferred embodiments, the aircraft lifts off vertically and lands vertically; in other embodiments (STOVL), the aircraft takes off with a shortened take-off roll and lands vertically (when the weight of the aircraft is reduced due to fuel consumption, payload reduction, etc.).

BRIEF DESCRIPTION OF THE DRAWINGS

These and other features and advantages will become clearer in view of the detailed description below and the associated Figures, in which.

DETAILED DESCRIPTION OF EMBODIMENTS OF THE INVENTION

The overall configuration of a manned embodiment 10 of an aircraft incorporating a lift/propulsion system according to the invention is illustrated in FIGS. 1-5. The aircraft 10 has a fuselage 12 with a cockpit/cabin 14. The main wing portion 16 of the aircraft 10 extends from about the lengthwise midpoint of the fuselage 12 to the rear of the aircraft 10. Each main wing has a generally rectangular root portion 16a, with a rearward-swept leading edge 18, and a forward-swept, outboard wing extension portion 16b. (The root portion 16a is actually a strake that can be thought of as part of the fuselage.) This forward-sweep configuration of the main wings provides enhanced maneuverability and control, particularly during VTOL and transition to forward flight.

In addition to the main wing portion 16, the aircraft 10 includes canards 20 extending from the fuselage 12 and located lengthwise generally proximate the cockpit/cabin 14. The canards 20 provide additional lift and enhance maneuverability and controllability of the aircraft 10.

At its rear, the aircraft 10 is provided with a pair of gas turbine engines 30, e.g., turbofans, with one engine 30 located on either side of the aircraft 10's longitudinal centerline. (Single-engine configurations of aircraft according to the invention are also contemplated; operational principles of the invention are the same.) The engines 30 are integrated into the root portions 16a of the main wings of the aircraft, so part of each engine's intake is located above the root portion 16a and part of each engine's intake is located below the root portion 16a, as is shown most clearly in FIGS. 1, 2, and 5. Each engine 30 has a thrust-directing directional nozzle 32, which nozzle 32 pivots vertically from an uppermost position that is parallel to the centerline of the aircraft 10 to a lowermost position of 105° below horizontal (thrust is directed 105° downward relative to the centerline of the aircraft 10, i.e., downward and actually 15° forward). If desired, the nozzles 32 may also be configured to pivot laterally for enhanced maneuverability in yaw, although that is not necessary to practice the invention.

The empennage 34 of the aircraft 10 includes twin vertical fins 36, with rudders 38, and all-flying (all-moving) stabilizers 40. The vertical fins 36 and stabilizers 40 are supported by and extend from the respective housings of the engines 30.

A number of electrically powered lifting fans 44 are provided on the aircraft 10. The lifting fans 44 generate sufficient thrust to lift, support, and lower the aircraft 10 in VTOL and hovering operation. In particular, in the illustrated embodiment of the aircraft 10, three lifting fans are provided in the root portion 16a of each main wing, ahead of the engine inlet, and two lifting fans are provided in each canard 20, for a total of ten lifting fans 44. It will be understood, of course, that the number, size, and location of the lifting fans 44 will vary depending on the overall size and configuration of the aircraft and that the inventive concept, explained more fully below, can be practiced with vastly differently configured aircraft.

The electric lifting fans 44 are illustrated in FIGS. 1-5 as completely open. However, a system of directional louvers and other door mechanism (not illustrated) covers each fan, in a manner known to those having skill in the art. The doors and louvers are opened during VTOL/hovering operation of the aircraft 10 and are closed during forward, wing-borne flight.

Figure 1:
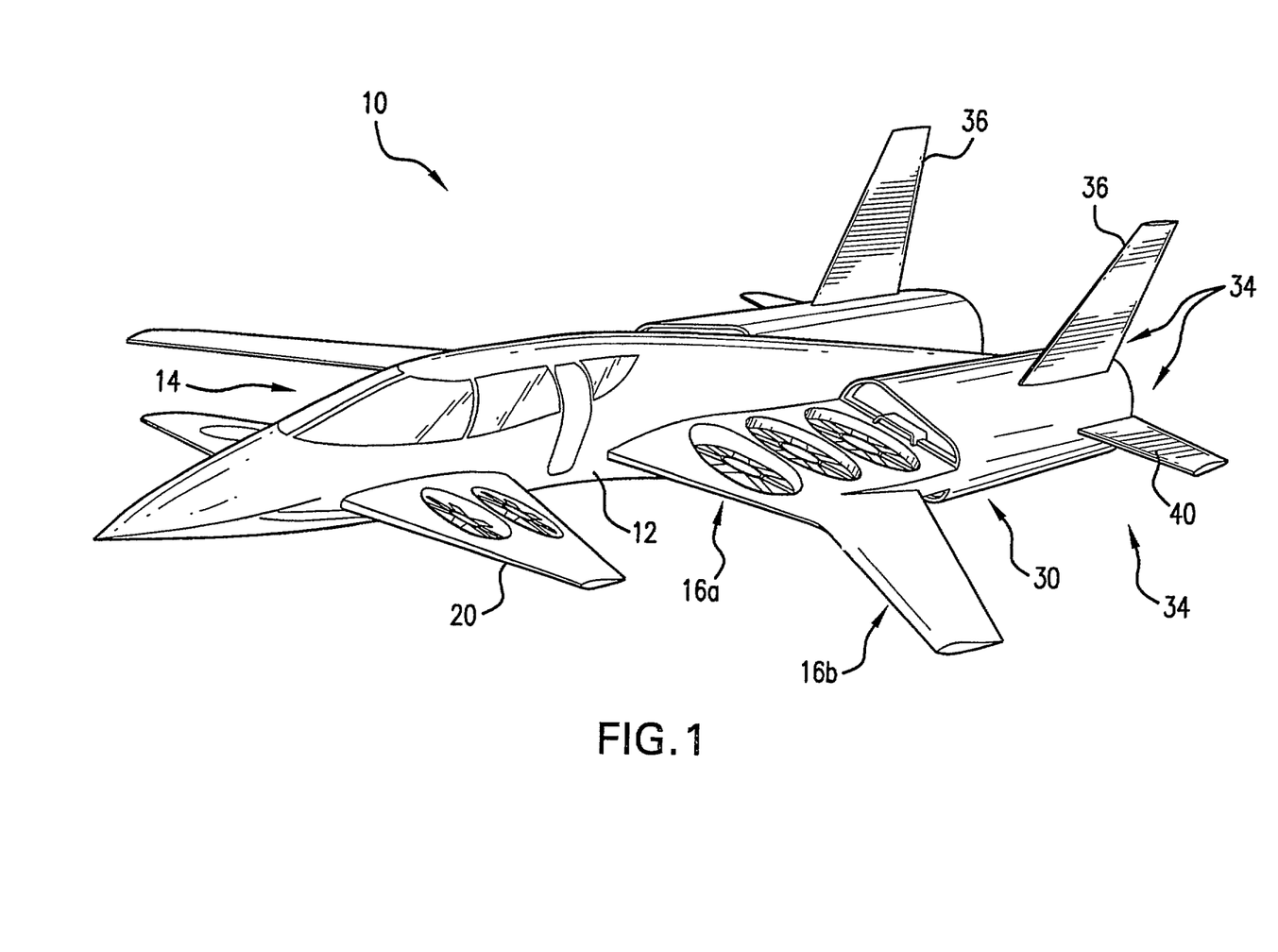
FIGS. 1-5 are a perspective view from above, a perspective view from below, a side elevation view, a plan view, and a front view, respectively, of an aircraft according to the invention.
Figure 2:
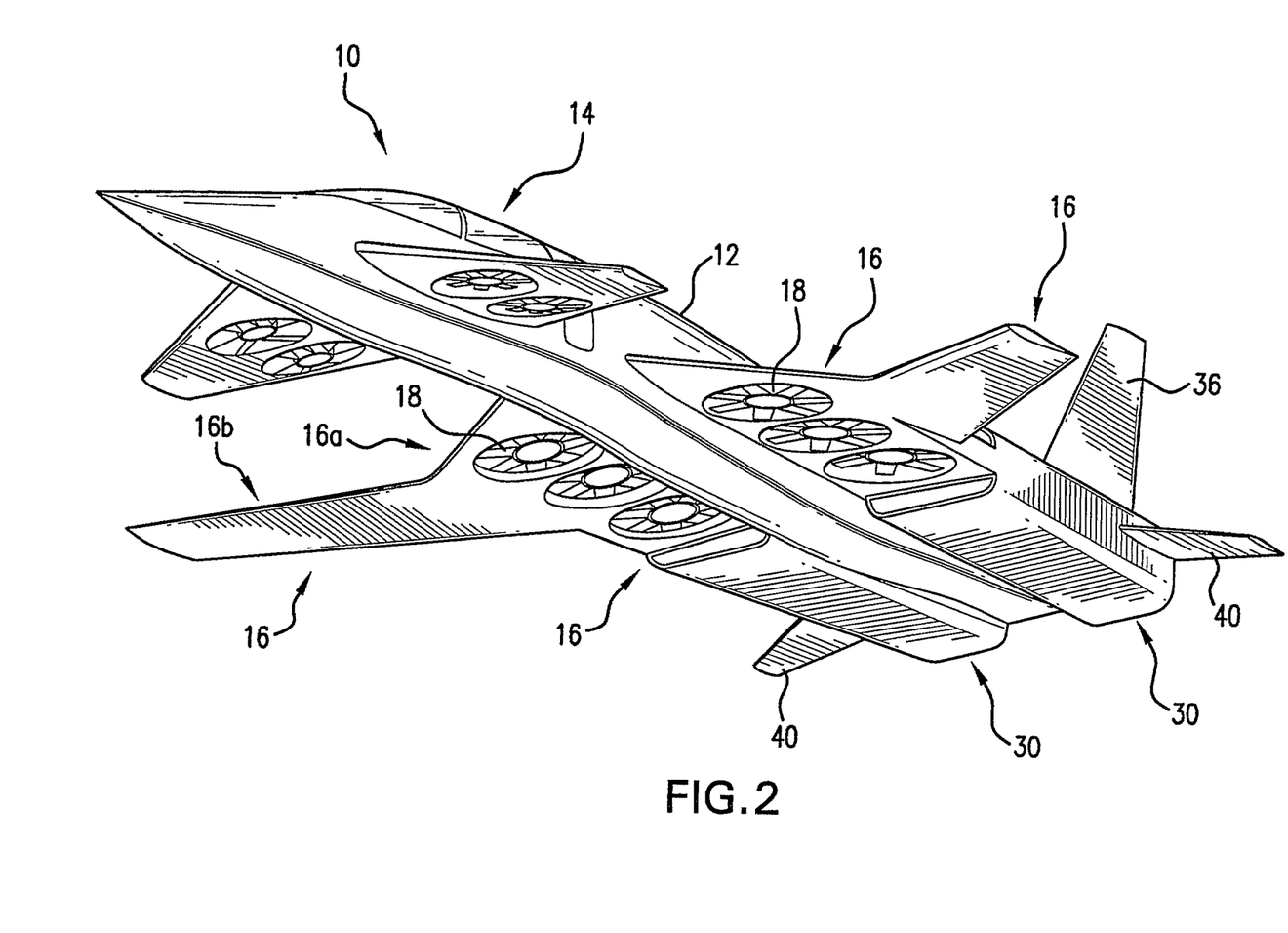
Figure 3:
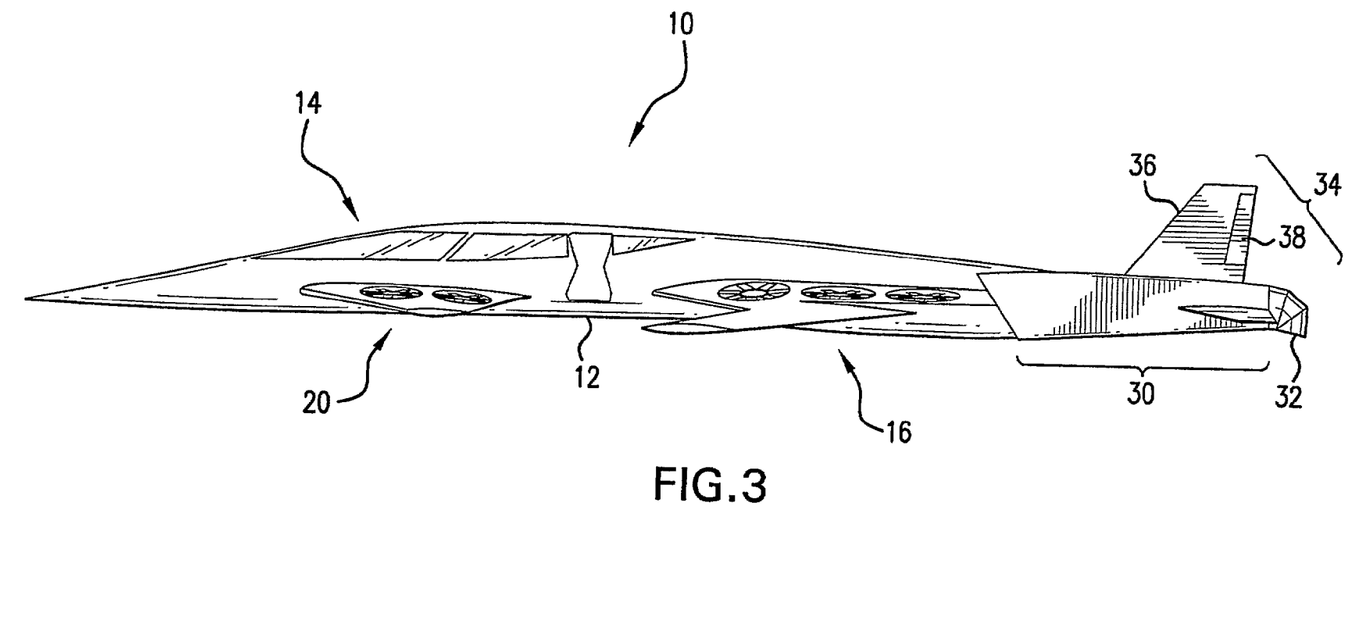
Figure 4:
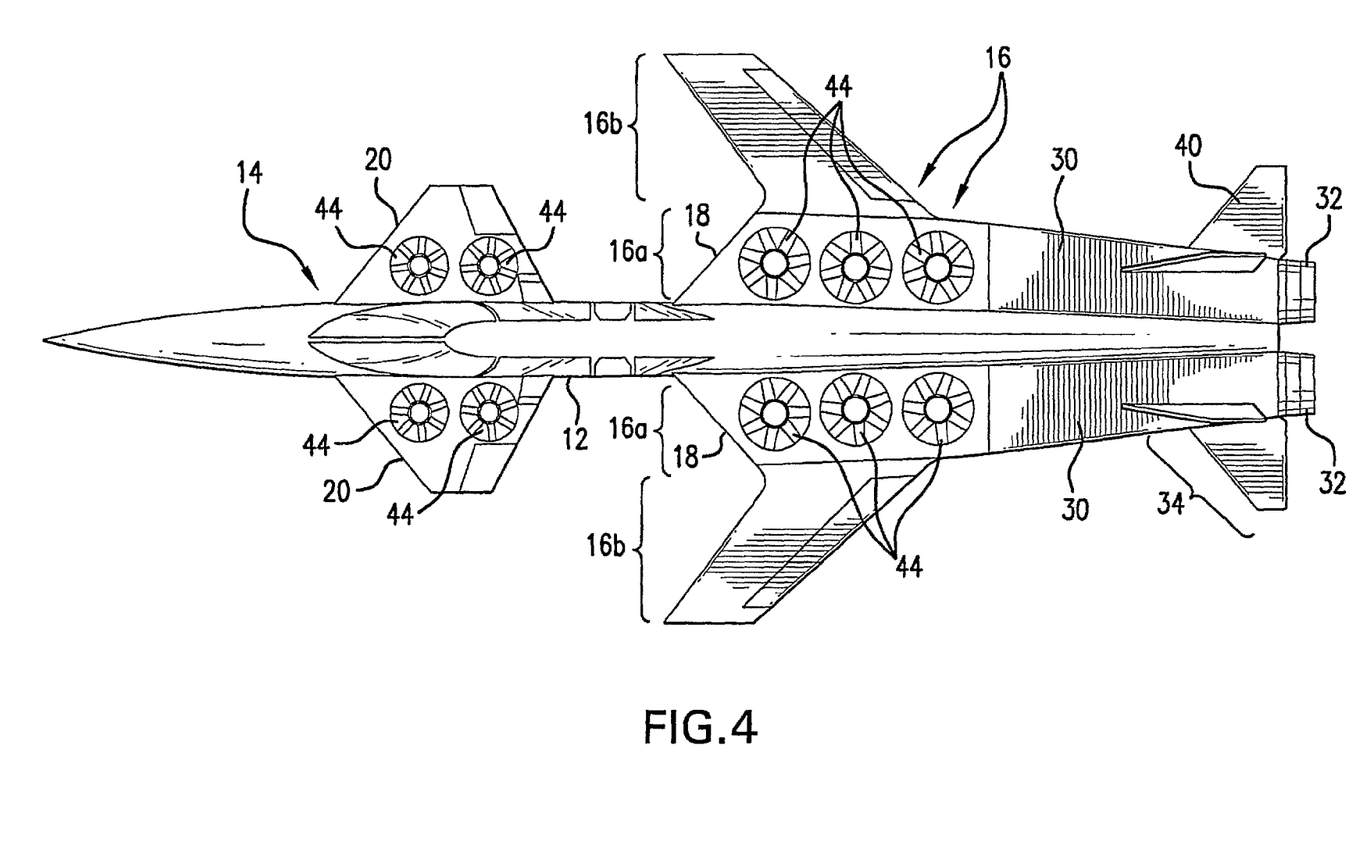
Figure 5:
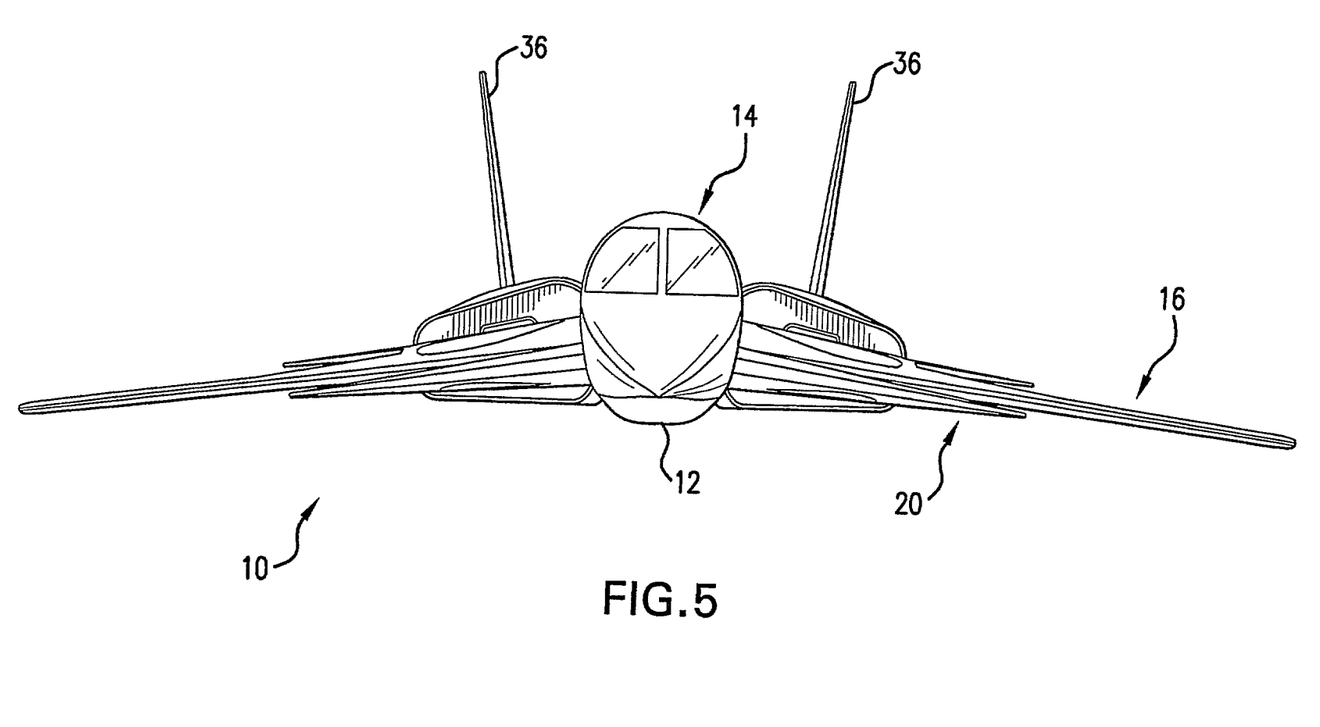
Figure 6:
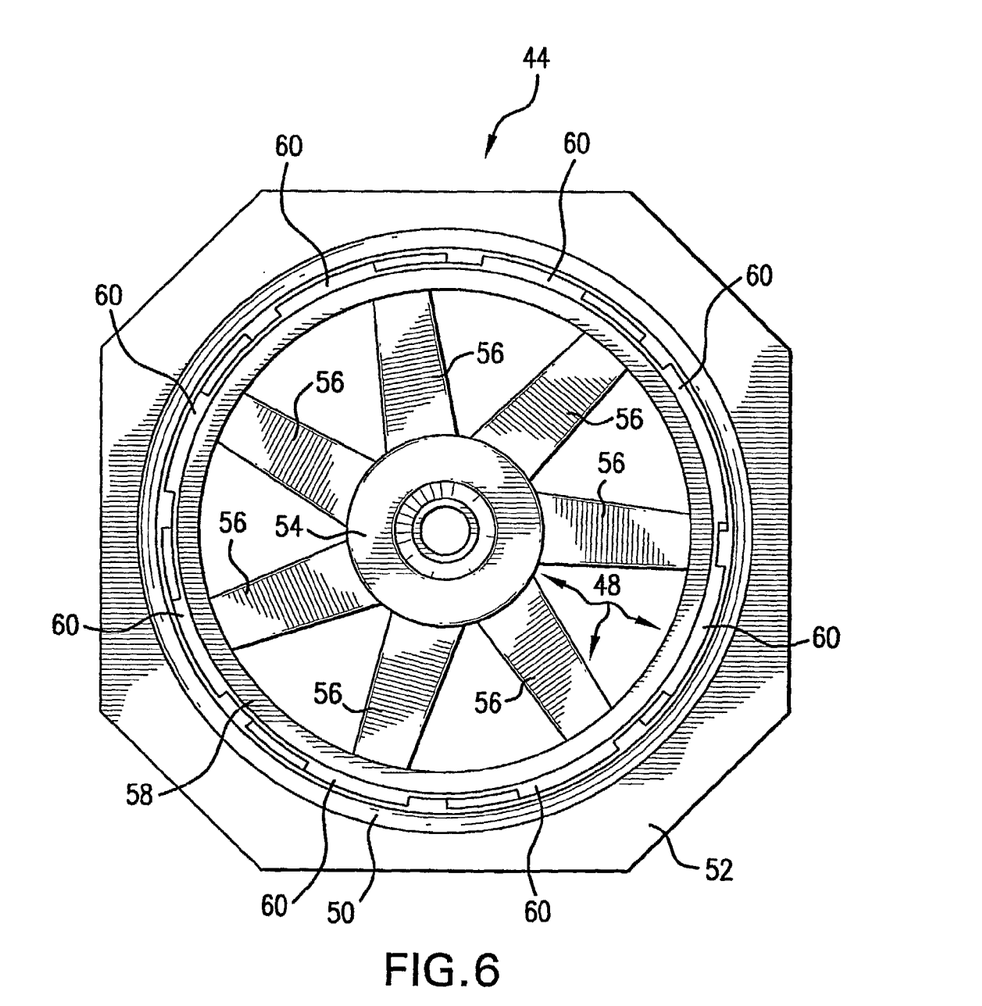
FIG. 6 is a plan view of an electric lifting fan used in the aircraft illustrated in FIGS. 1-5.

A preferred embodiment of an electric lifting fan 44 is shown in greater detail in FIG. 6 (again, without louvers being shown). The lifting fan 44 includes a multi-bladed fan member 48, which is centered within a superconducting magnetic coil 50. Superconducting magnetic coil 50 may be integrated into the preferably composite skin 52 of the aircraft wing/fuselage. Fan member 48 is fabricated from a central hub 54, from which a number (e.g. seven, as shown) of fan blades 56 extend. The tips of the fan blades 56 are joined together by means of tip ring 58. Preferably, the central hub 54, fan blades 56, and tip ring 58 are fabricated as a single integral unit. A series of permanent magnets 60 are attached (e.g., bonded or embedded) to the tip ring 58 around the circumference of the fan member 48, and a small gap on the order of 1.0 mm is maintained between the radially outer surfaces of the permanent magnets 60 and the radially inner surface of the superconducting magnetic coil 50. Although not specifically illustrated as such for clarity, the magnetic coil ring structure 50, which is made from titanium, has a C-shaped cross section so as to form a channel. The tip ring 58 is a composite structure with a shape that is the male counterpart of the C-shaped channel and thus fits precisely in the 1.0 mm gap, magnetically suspended therein and restrained/guided against the out-of-plane loads the rotating fan will create under operation against the superconducting coil ring frame 50. With this configuration, the fan member 48 is magnetically centered within the superconducting magnetic coil 50 and can be electromagnetically driven at an extremely high rate of revolution, on the order of 3600-8500 revolutions per minute (depending on the size of the fan and the power of the fan motor).

Figure 7:
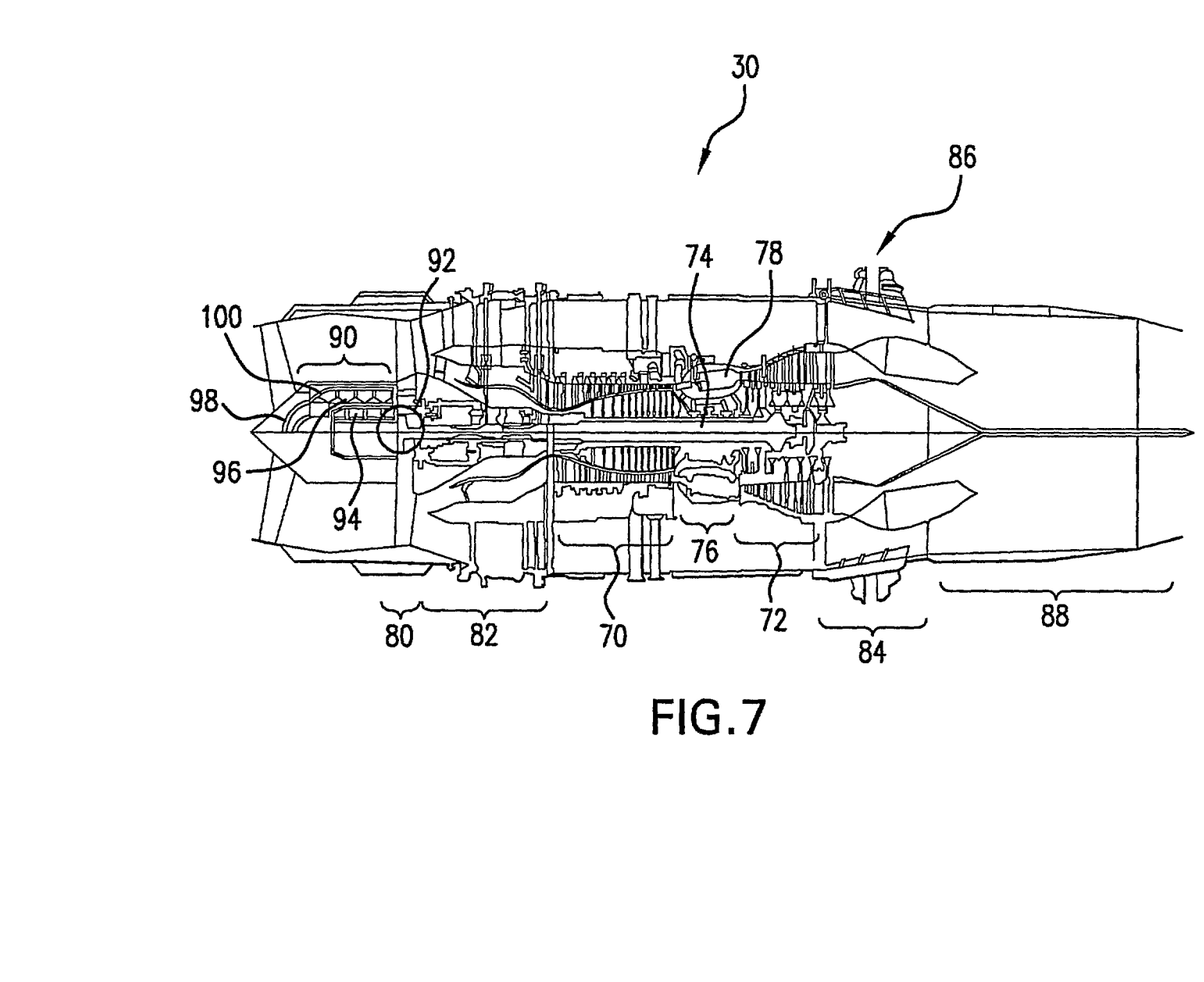
FIG. 7 is a section view of an engine with a turbine-driven generator according to the invention.
Figure 8:
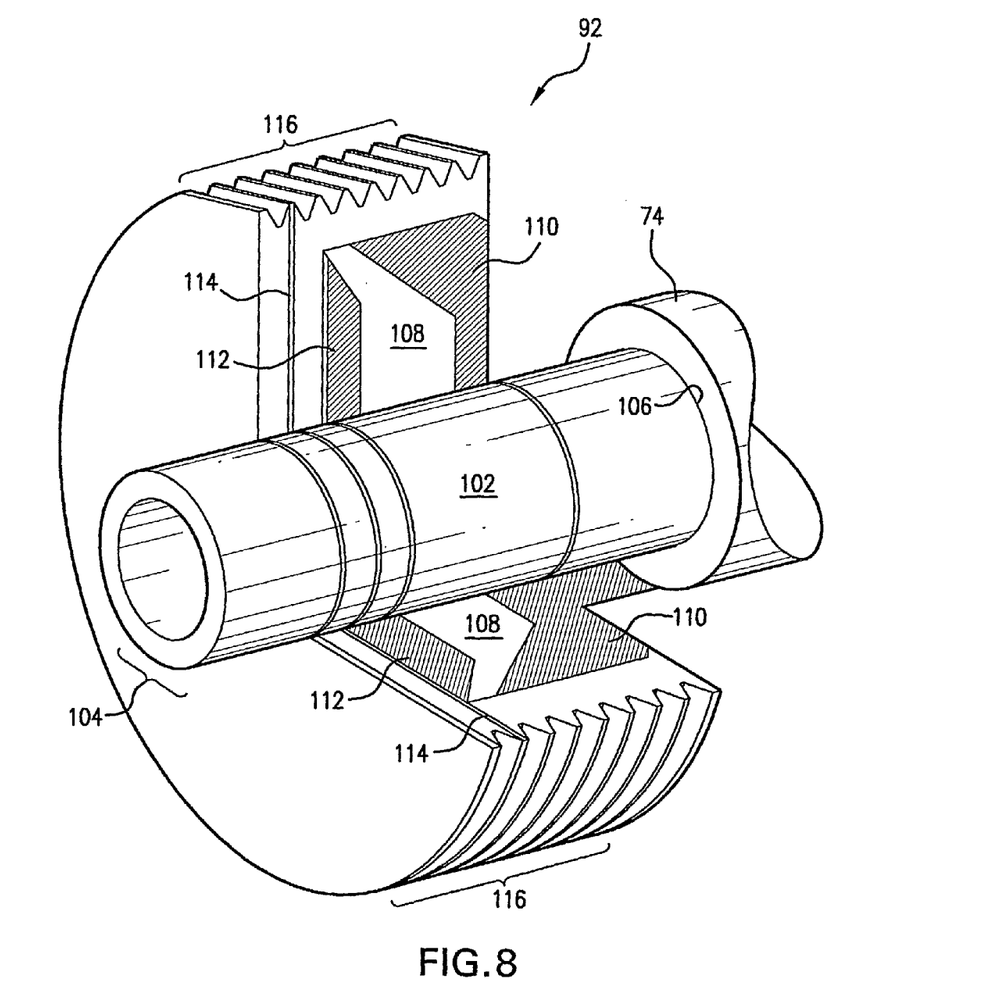
FIG. 8 is a perspective view, partially cut away, of an electric clutch used in the engine shown in FIG. 7.
Figure 9:
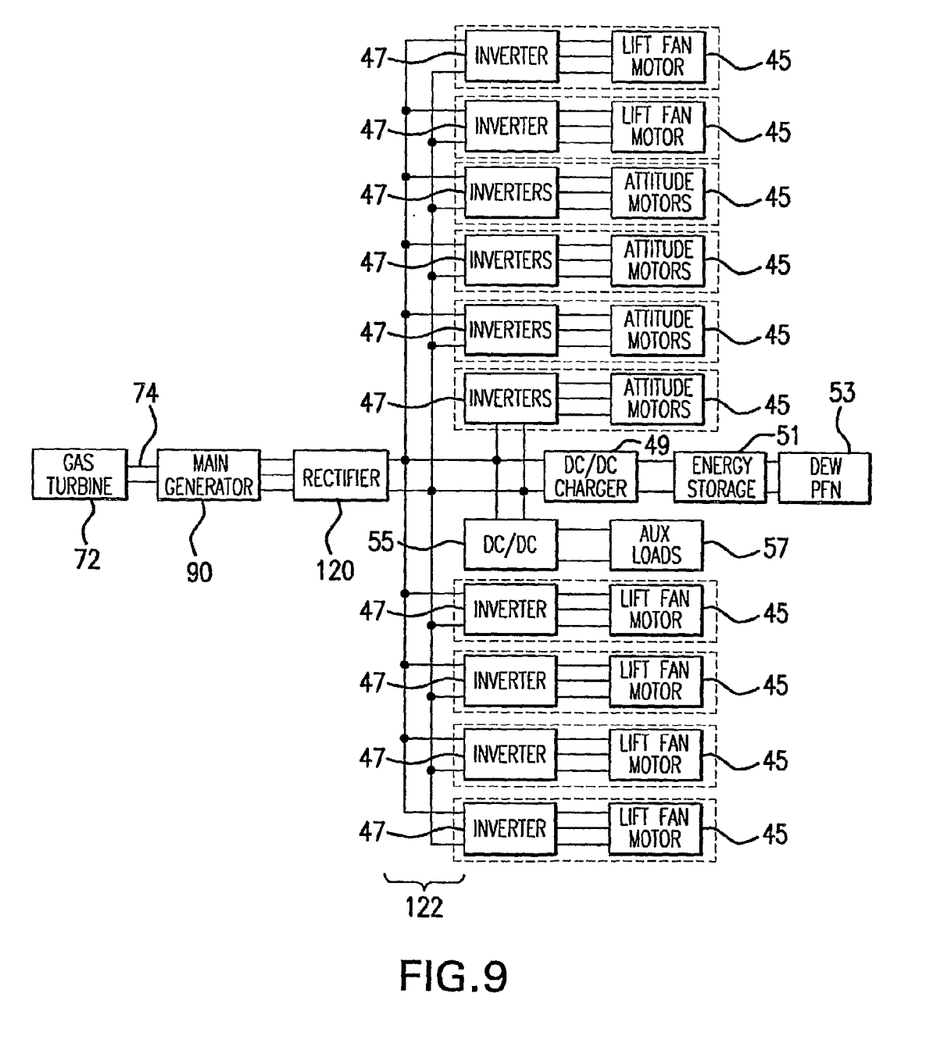
FIG. 9 is a schematic view of the electrical architecture of an aircraft according to the invention.

Electrical power to drive the lifting fans 44 is generated on board the aircraft 10. In particular, it is generated by a generator (preferably a superconducting generator) that is driven by one of the engines 30. Such a system is illustrated in FIGS. 7-9. (The description that follows will be directed toward just one of the engines; it will be appreciated that, where there are multiple engines on the aircraft, one or more than one generator can be used, with generators on each of at least two of the engines.)

As illustrated in FIG. 7, an engine 30 according to the invention includes, in large measure, generally known components. For instance, the engine—in this embodiment a low-bypass turbofan engine—include a compressor section 70 with multiple compressor stages (not individually numbered); a turbine section 72 with multiple turbine stages (not individually numbered); a main shaft 74 interconnecting the turbine section 72 with the compressor section 70 to drive the compressor section by expansion of hot gas through the turbine section 72; and an annular burn ring or combustor section 76, with fuel injector ring 78, all of which are generally known in the art. Furthermore, the engine 30 includes a turbofan section 80 (driven by the turbine section 72 via the main shaft 74); core and bypass inlet section 82; afterburner section 84 with fuel dump injectors 86 for the afterburners; and exhaust nozzle 88, all of which are generally known in the art.

As is further illustrated in FIG. 7 and represented in FIG. 8, an engine 30 according to the invention also includes a generator 90 that is selectively driven by the turbine 72 via the main shaft 74. In particular, electric clutch 92—electric clutches are generally known in the art—is used to engage and disengage the generator 90 to and from the main shaft 74. Electric power is stored on board the aircraft in an energy storage system. Residual electric energy can be stored and used for ground start-up and operation of the electric clutch. The energy generation system is sized for engine start-up and to run the electric clutch. During start-up, usually a ground start cart is also utilized for electric power of environmental systems.

The generator 90 includes magnets 94, which are centered within and rotates within coil casing 96. Power cables 98 are used to take off electrical current generated by the generator 90 and distribute it to the lifting fan system, as explained in more detail below. The generator is oil-cooled, so oil cooling channels 100 pass throughout the superconducting coils of the generator outer structure coil casing 96.

As indicated above, electric clutches are generally known in the art. An electric clutch assembly 92 for use in the present invention, however, is illustrated in greater detail in FIG. 8. The electric clutch assembly includes a clutch spindle 102 around which or onto which various components of the clutch assembly are rotationally mounted. The forward end 104 of the clutch spindle 102 is spline-fit to the central shaft of the generator 90, and the rearward end 106 of the clutch spindle 102 is spline-fit to the main turbine shaft 74. The clutch assembly 92 further includes a permanent magnet armature 108 and magnetic excitation coils 110 and 112. Coil charge lines 114 extend throughout the clutch assembly 92, and the clutch assembly may be provided with magnetic air bearing guides 116. The net effect of the construction of the electric clutch assembly 92 is that when the clutch assembly is not energized, the main shaft 74 is decoupled from the central shaft of the generator 90, and the turbine does not drive the generator. When, on the other hand, the electric clutch assembly 92 is energized from the electric storage system or the ground start system, the main turbine shaft 74 is electromagnetically coupled to the central shaft of the generator 90 such that the turbine 72 drives the compressor 90.

A schematic diagram of the overall electrical system by means of which the lifting fans 44 are driven is shown in FIG. 9. As illustrated, gas turbine 72—coupled to the generator via the electric clutch assembly 92 (not illustrated)—drives the main generator 90. Rectifier 120 converts the alternating current produced by the main generator 90 into direct current, which is distributed along power bus 122 to the various lifting fans 44. Each lifting fan 44 is driven by a fan motor 45, and each fan motor 45 has an inverter 47 associated with it to smooth, condition, and regulate the amount of direct current from the power bus 122 before it is fed to the particular fan motor 45. Thus, each electric fan has its own power or speed controller and may be governed independently or in a specific sequence for flight (take-off, landing, or transition. (As illustrated in FIG. 9, four of the ten motors 45 are designated "Attitude Motors," and the remaining six of the ten motors 45 are designated simply "Lift Fan Motors." In the illustrated embodiment, the four Attitude Motors drive the lift fans 44 located in the canards 20, while the other six Lift Fan Motors drive the lift fans 44 located in the main wings 16.)

As further illustrated in FIG. 9, the electrical system may also include a DC/DC charger 49, which charges high-capacity energy storage member 51 (e.g., a DC-charged capacitor bank of 6000 µF, with peak power to 1200 Kw, 0 to 10,000 volts, 300 Kj in 2.0 seconds). High-capacity energy storage member 51 provides electrical power to an energy-intensive load (i.e., a load that requires a large amount of energy) such as a directed energy weapon, e.g., laser or microwave (or, more specifically, to a pulse-forming network constituting a subsystem within the DEW which modifies the pulse to match the pulse coming off the generator, so as to run high-power electric weapons).

Furthermore, the electrical system may include a DC/DC charger 55 that charges the energy storage system at a low rate when the fans are in operation and a high rate when the fans are not needed, or when auxiliary power is at a minimum requirement. When there is excess power draw on the system, the DC/DC charger 55 maintains a minimum storage capacity in the storage system so that all critical electrical functions of the aircraft (central computer, flight controls) are maintained.

Figures 10A, 10B, 10C, 10D:
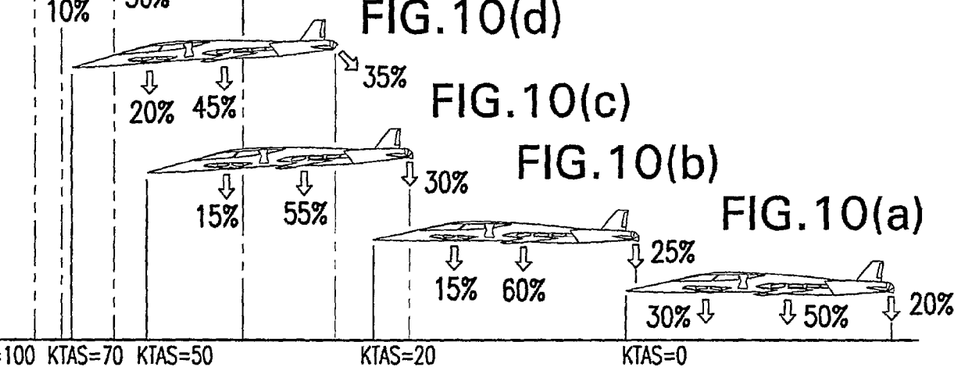
FIGS. 10(a)-10(h) are a time sequence illustrating performance of an aircraft according to the invention, from vertical take-off through forward wing-borne flight.
Figures 10E, 10F, 10G, 10H:
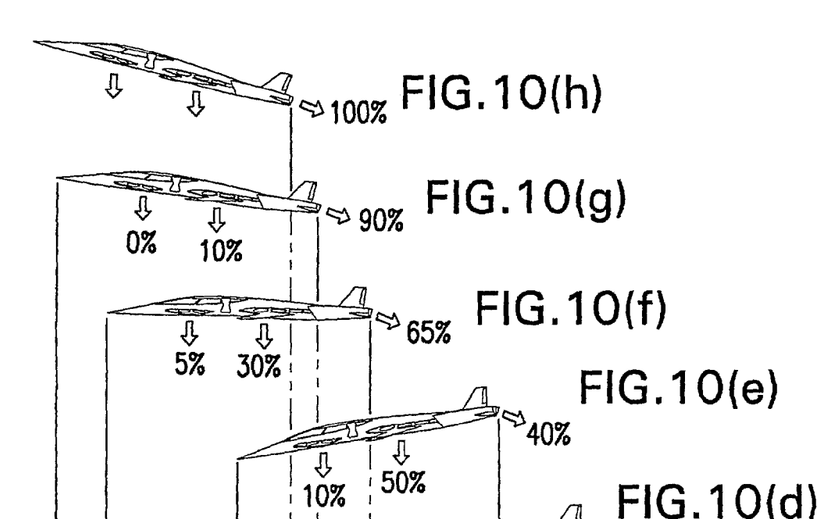

An example of flight operation of an aircraft 10 according to the invention with a generator on each of the engines, from vertical take-off through forward, wing-borne flight, is illustrated in FIGS. 10($a$)-10($h$). The sequence of figures illustrates the distribution of power generated by the gas turbine engines among the forward lifting fans 44 in the canards 20 (i.e., the attitude control fans), the main lifting fans 44 in the main wings 16, and out the rear of the engines in the form of exhaust-based thrust. For example, at lift-off, illustrated in FIG. 10($a$), 30% of the power generated by the engines is used by the lifting fans 44 in the canards 20 in creating downward-acting thrust; 50% of the power generated by the engines is used by the lifting fans 44 in the main wings 16 in creating downward-acting thrust; and the remainder of the power generated by the gas turbine engines (20%), which exists in the form of exhaust-based thrust, is directed out the rear of the engines. As noted above, the nozzles 32 of aircraft 10 are thrust-vectoring; at takeoff, the nozzles are rotated downward so that the exhaust-based thrust produced by the engines is directed straight downward.

Forward flight is initiated by pivoting the nozzles 32 such that the exhaust-based thrust produced by the engines begins to be directed rearward. For example, FIG. 10(b) shows the aircraft with the nozzles 32 pivoted slightly rearward, which is sufficient to begin moving the aircraft forward (e.g., at a speed of 20 knots). At this point, an increasing percentage of the power produced by the engines (25%) is being used as exhaust-based thrust, and less is being used in the form of electric fan-based lifting thrust (15% canard fans/60% main wing fans). This trend continues as illustrated in FIGS. 10(c)-10(h), with more and more power generated by the engines being used in the form of exhaust-based thrust as the nozzles continue to pivot to bring the vector associated with that thrust to the final forward-flight orientation; with less and less power generated by the engines being used in the form of fan-based lifting thrust; and with forward speed of the aircraft increasing. Ultimately, the fans may shut down altogether and their louvers closed, at which point the entire weight of the aircraft is borne by the wings and any other lifting surfaces on the aircraft, or the fans may continue to be used to provide a nominal amount of lift and/or attitude control in pitch, roll, and/or yaw.

It may be observed that while the percentage of engine power utilized in the form of exhaust-based thrust increases monotonically from FIG. 10(a) to FIG. 10(h), the specific percentages of power utilized by the lifting fans in the canards and the lifting fans in the main wings do not decrease monotonically, but rather increase slightly then decrease again at certain points in the flight envelope. The overall trend, however, is for the amount of power utilized in driving the lifting fans to go to zero as forward speed of the aircraft increases and more and more of the weight of the aircraft is borne by the wings. The specific amount of thrust that needs to be generated by each of the various lifting fans will depend, in part, on the specific orientation of the aircraft and may be "hard-wired" into the flight takeoff software or result from adaptive avionics control/auto-pilot.

It will be appreciated that, depending on the weight of the aircraft and the lifting capability of the fans, it may be necessary to initiate a forward roll while the aircraft is still on the ground, to generate a certain amount of airspeed to help lift the aircraft off the ground. In other words, STOVL operation as opposed to VTOL operation may be required.

It will be further appreciated that the aircraft 10 can land vertically by largely reversing the vertical take-off procedure described above. In particular, the engine nozzle is rotated downward (if it is thrust-vectoring enabled) and the amount of thrust produced by the engine is reduced, while the lifting fans are opened and generate more and more lifting force as the aircraft slows and less weight is borne by the wings. To slow the aircraft, it may be necessary or desirable to provide reverse thrust, e.g., by using the airflow-directional control capability of the louvers covering the lifting fans and/or by rotating the engine nozzle down and slightly forward (e.g., 105° down from aft horizontal, i.e., 15° forward of straight down). The aircraft then settles to the ground, supported by the lift provided by the lifting fans and the residual thrust produced by the engine.

While the invention has been described with respect to a specific embodiment (e.g., a manned vehicle), it will be appreciated that the inventive concept can be incorporated into a wide variety of VTOL aircraft configurations, including unmanned as well as manned configurations. Furthermore, while operation of the aircraft is illustrated in FIG. 10 with pitching motion controlled by the relative amounts of power applied to the various groups of fans and being exhaust as exhaust-based thrust, it should be appreciated that differential application of power among the various fans—particularly as between the fans on the opposite lateral sides of the aircraft—can be used to effect roll, and yaw responses are produced by the torque moments caused by the operating fans in certain locations of the aircraft. Thus, the invention is defined by the following claims.

We claim:

1. A fixed-wing VTOL or STOVL aircraft, comprising:
   an airframe comprising a fuselage and forward-swept wings, wherein each of the forward-swept wings includes a root portion;
   a thrust-producing gas turbine engine;
   an electrical generator that is driven by said gas turbine engine to generate electricity;
   a plurality of electric lift-producing fans distributed across said airframe, wherein at least a portion of the electric lift-producing fans are located in the root portion of the forward-swept wings; and
   an electrical system configured and arranged to provide electricity generated by said electrical generator to said electric fans to power said electric fans.

2. The aircraft of claim 1, wherein said fans, in total, are able to support at least 25% of the weight of said aircraft.

3. The aircraft of claim 2, wherein said fans, in total, are able to support at least 50% of the weight of said aircraft.

4. The aircraft of claim 3, wherein said fans, in total, are able to support at least 90% of the weight of said aircraft.

5. The aircraft of claim 4, wherein said fans, in total, are able to support the entire weight of said aircraft.

6. The aircraft of claim 1, further comprising a thrust-vectoring nozzle which is able to redirect thrust produced by said engine between a primarily aft-oriented direction and a primarily downward-oriented direction.

7. The aircraft of claim 1, wherein said electrical generator is selectively drivable by said gas turbine engine.

8. The aircraft of claim 7, further comprising an electric clutch by means of which said electrical generator is coupled to and decoupled from said gas turbine engine.

9. The aircraft of claim 1, wherein the root portions of the forward-swept wings are strakes forming part of the fuselage.

10. The aircraft of claim 1, further comprising canards.

11. The aircraft of claim 10, wherein at least some of said fans are located in said canards.

12. A method of operating an aircraft, the aircraft having forward-swept wings, a thrust-producing gas turbine engine, an electrical generator driven by the engine, and a plurality of electrically driven lifting fans, said method comprising:
   lifting the aircraft off of a surface using the lifting fans to lift at least some of the weight of the aircraft, wherein the lifting fans are powered by electricity generated by the generator and at least a portion of the lifting fans are located in root portions of forward-swept wings of the aircraft;
   decreasing the amount of lift generated by the lifting fans, whereby the lifting fans support a decreased amount of the weight of the aircraft;
   increasing thrust produced by the engine and directing at least a component of the thrust in a rearward direction so as to move the aircraft in a forward direction, whereby the forward-swept wings support an increased amount of the weight of the aircraft; and
   repeating steps b) and c).

13. The method of claim 12, wherein steps b) and c) are repeated until none of the weight of the aircraft is supported by the lifting fans and all of the weight of the aircraft is supported by the forward-swept wings and any other lift-generating surfaces on the aircraft.

14. The method of claim 12, wherein the lifting fans initially support all of the weight of the aircraft.

15. The method of claim 12, wherein the lifting fans initially support less than all of the weight of the aircraft, said method further comprising initially directing at least a component of the thrust in a downward direction such that the downward-directed component of thrust supports a portion of the weight of the aircraft.

16. The method of claim 15, further comprising redirecting the thrust toward a rearward-acting direction as steps b) and c) are repeated.

17. The method of claim 12, wherein the aircraft initially lifts off of the surface vertically.

18. The method of claim 12, wherein the aircraft initially moves forward over the surface to generate wing-based lift before lifting off of the surface.

19. A method of operating a fixed forward-swept-wing aircraft, the aircraft having a thrust-producing gas turbine engine, an electrical generator, and a plurality of electrically driven lifting fans, at least a portion of which are located in root portions of forward-swept wings of the aircraft, said method comprising:

driving the generator with the gas turbine engine to generate electricity;

driving the lifting fans with the electricity generated by the generator;

hovering the aircraft supported at least in part on lift created by the lifting fans and providing any remaining required lift support by the forward-swept wings.

20. The method of claim 19, wherein the entire weight of the aircraft is supported by the lifting fans during said hovering.

21. The method of claim 19, wherein less than the entire weight of the aircraft is supported by the lifting fans during said hovering, said method further comprising directing thrust produced by the gas turbine engine downward to help support the weight of the aircraft.

22. A method of improving the lifting power loading efficiency of a fixed forward-swept-wing, gas turbine engine-powered VTOL or STOVL aircraft, comprising distributing the lifting power produced by the gas turbine engine to a series of electric lifting fans distributed over the body of the aircraft by converting mechanical power produced by the gas turbine engines to electrical power and using the electrical power to drive the series of electric lifting fans, wherein at least a portion of the series of electric lifting fans is located in root portions of forward-swept wings of the aircraft.

* * * * *